Figure 1:
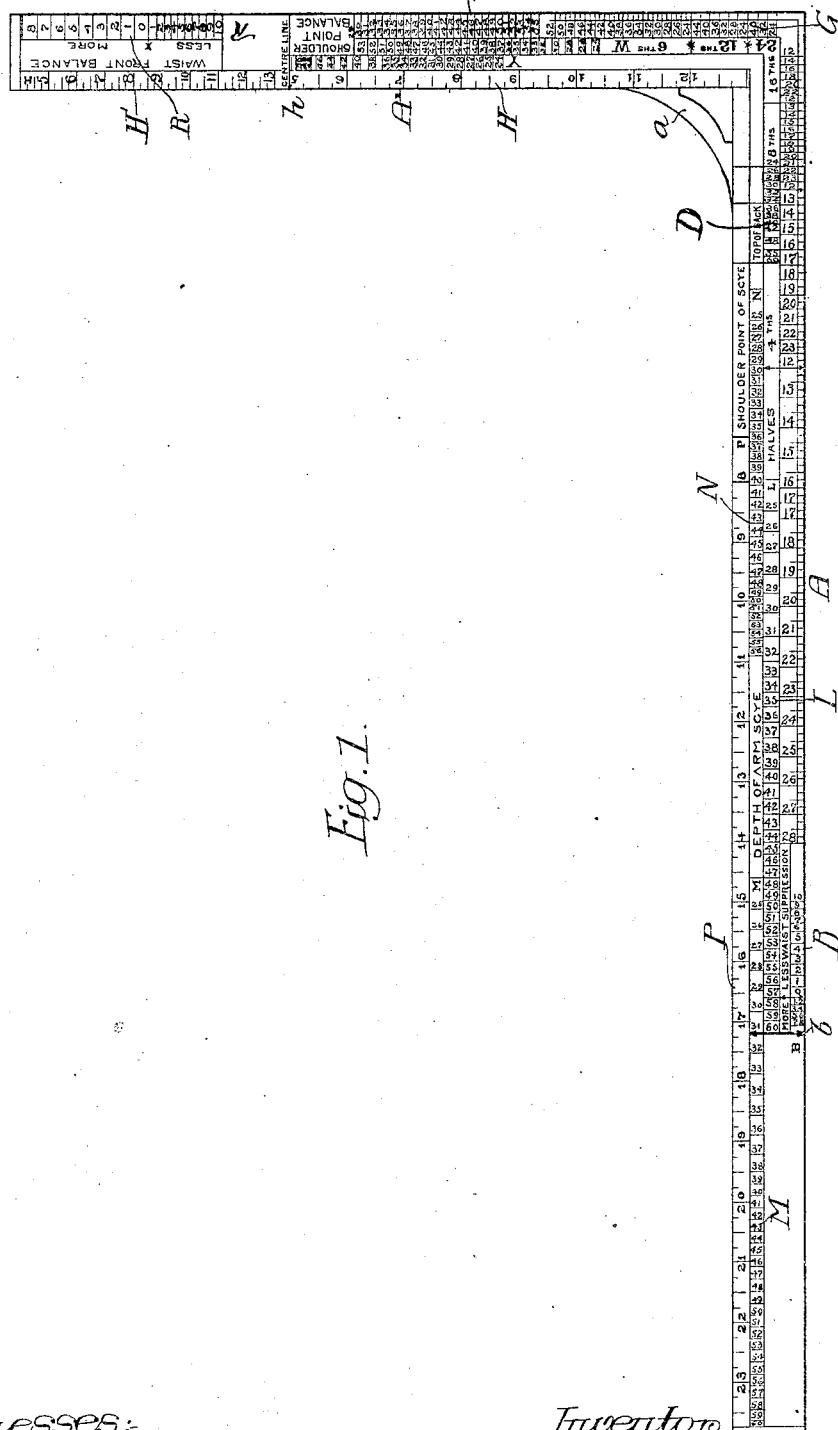

G. A. MONGELLI.
RULE.
APPLICATION FILED APR. 13, 1906.

941,936.

Patented Nov. 30, 1909.
2 SHEETS—SHEET 1.

Witnesses:
Walter F. Pullinger.
Titus H. Irons.

Inventor
Giuseppe A. Mongelli.
by his Attorneys:
Howson & Howson

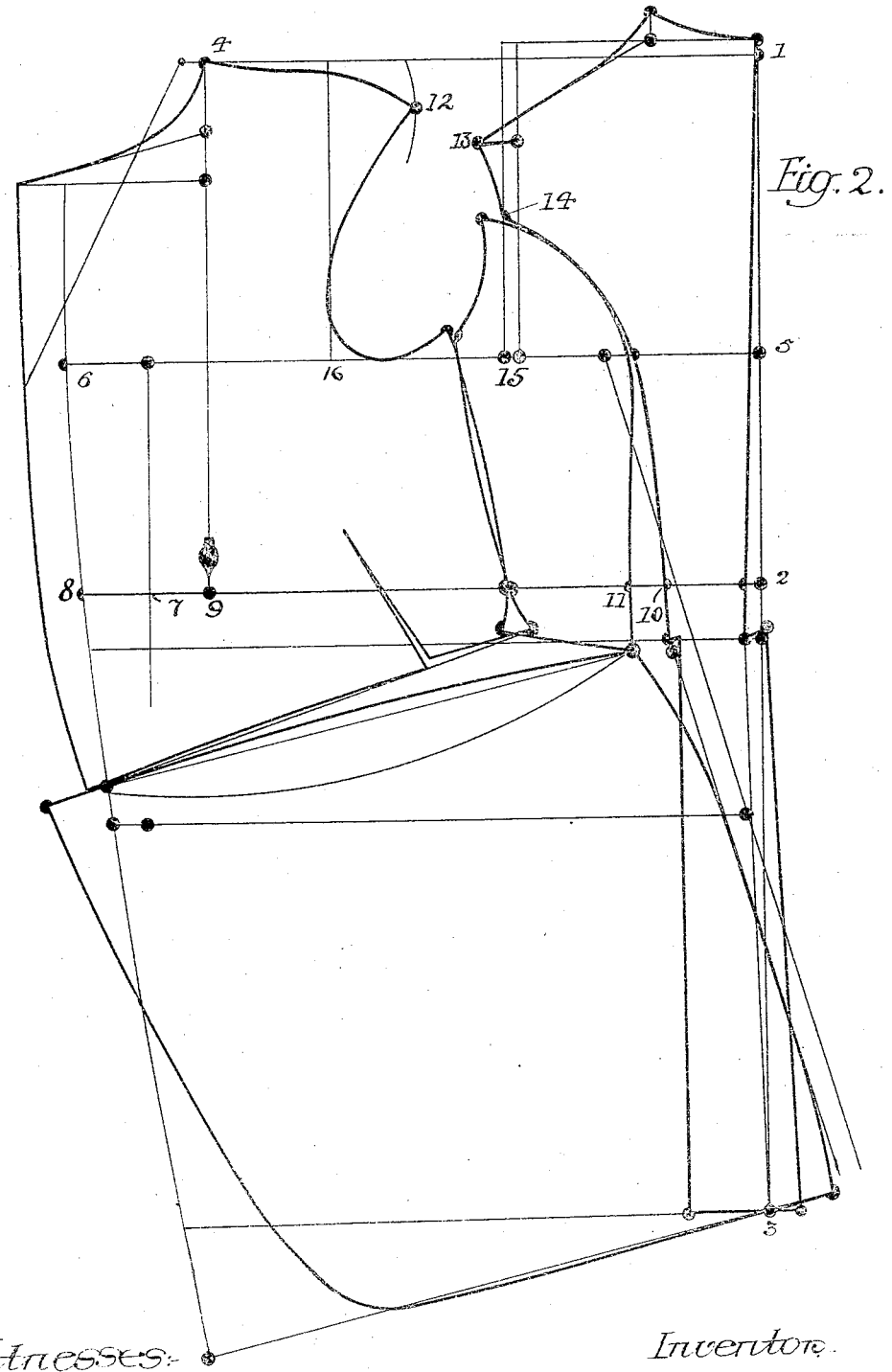

UNITED STATES PATENT OFFICE.

GIUSEPPE A. MONGELLI, OF PHILADELPHIA, PENNSYLVANIA.

RULE.

941,936.   Specification of Letters Patent.   Patented Nov. 30, 1909.

Application filed April 13, 1906. Serial No. 311,507.

*To all whom it may concern:*

Be it known that I, GIUSEPPE A. MONGELLI, a subject of the King of Italy, (who have declared my intention of becoming a citizen of the United States,) residing in Philadelphia, Pennsylvania, have invented certain Improvements in Rules, of which the following is a specification.

My invention consists in an improved rule for drafting garment patterns, one object being to provide such a rule with a number of arbitrary scales, certain of which are graduated in units bearing a definite relation to the actual size of some one or more measurements taken on the person for whom the garment is to be made.

It is further desired to provide a rule having a number of scales from which all of the dimensions necessary for the drafting and cutting of any garment can be obtained, if certain measurements taken on the person for whom the garment is to be made be furnished; these latter being usually the breast and waist measurements.

These and other advantageous ends hereafter noted I obtain as follows; reference being had to the accompanying drawings, in which:—

Figure 1, is a plan of my improved rule, and Fig. 2, is a cutting out diagram for a portion of a garment, illustrating the use of my invention.

In the above drawings, the rule is illustrated as consisting of two parts or sections A and A', rigidly connected at right angles to each other and having their internal angle strengthened by a curved brace piece $a$. One side of the portion A of the rule has upon it a number of longitudinally extending parallel lines, of which two extend for its whole length. Between the first of these lines and the inner edge of this portion of the rule are graduations forming a scale P which under operating conditions, is referred to as the scale for laying off the depth of the arm scye, and it may be noted that the divisions of this scale P are marked out with reference to the outer edge of the section A' of the rule as a zero line. The graduations of this scale are numbered from 8 to 24; being subdivided into inches and fractions thereof. Between the first and second of the lines extending the full length of the section A there are laid off two scales M and N; the first of which is graduated in arbitrary divisions numbered from 25 to 60, and is particularly intended for use in laying off upon material to be cut, the front balance length, *i. e.* the distance from the line 1—4 to the waist line 8—2 of Fig. 2. I have found that each one of the dimensions required in laying out garments varies for each individual in a definite manner relatively to his breast measure, and in the case of the scales M and N, as well as of those hereafter referred to, the total length of such scale represents the maximum size of that particular measurement which may be found to exist in practice. The minimum size of this measurement is also laid off on the scale, and the space between said minimum and the maximum is graduated in divisions whose number is equal to the possible number of inches of variation between the maximum and minimum breast measures as found on a number of individuals. The second scale N between the two full length lines on section A has its divisions numbered from 25 to 56 and is employed in determining the shoulder point of the scye, indicated at 12.

The divisions of the scale M as well as those of a scale L are laid off at a definite distance from the adjacent end of a scale D whose divisions in turn are referable to the outer edge of the section A' as a zero line. This latter scale D is provided with divisions numbered from 24 to 60 inclusive, and it is employed in determining the width of the top of the back of the coat;—it being noted that said divisions represent possible variations in the breast measurements of different individuals and that the actual sizes of said divisions are different for each scale, being of arbitrary dimensions found by experience.

The scale P, which as above noted, is graduated in inches and fractions thereof, is intended for use when the actual measurement of the depth of the arm scye is given, in which case such measurement is laid off in inches therefrom on the cloth or material to be cut, although if the breast measure only is given, I employ the sc.¹· L.

At another point along the outer edge of the section A of the rule is placed a scale B employed in determining what is technically known as the "waist suppression" or distance between the two points 10 and 11, Fig. 2 on the waist line of a garment, which dimension is required for laying off the space between the adjacent edges of the back and side body of the garment. These divisions are of variable size, as determined by experience, and are numbered from a reference line $b$, starting at 7.8 and running to zero and then continuing from zero in the same direction to 10.

In the event of the waist measure being less than the breast measure, the part of the scale numbered from zero to 10 and marked "Less" is employed; the measure being taken from the reference line $b$ to the number found by subtracting the waist measure from the breast measure. On the other hand, if the waist measure is greater than the breast measure, the number found by subtracting said two measurements is taken on that portion of the scale found under the word "More" and the measurement is laid off from said number to the line $b$.

The section $A'$ of the rule has extending adjacent to its inner edge a line between which and said edge is a scale H graduated in inches; the portion of said scale illustrated being graduated from 5 to 12 inclusive. A line $h$, extending transversely of this section of the rule and marked "Center line", is placed on the division of this scale indicated by the numeral 5, and between said line and the outer end of the section $A'$ is a portion $H'$ which, like the scale H, is graduated in fractions of inches, indicated by the numerals 5 to 13. This latter portion of the scale is employed in determining what is known as the back point 13 of the scye. Between the outer end of the section $A'$ of the rule and the line $h$ is placed a scale R for determining the waist front balance, or the distance from the breast line 7 to the front of the garment 8. This scale is graduated in divisions of varying sizes, which I have determined by experience, and which extend in both directions from a line marked "Zero" placed at a distance from the line $h$ equal to the standard measurement of the waist front balance, these divisions being numbered in one instance from 1 to 8 and in the other from 1 to 10. The first set of said divisions is indicated by the word "More", being employed when the waist measure is greater than the breast measure, while the latter set of divisions is marked "Less" and is employed when the waist measure is less than the breast measure.

For the determination of the shoulder point balance, or the distance from the breast line 7 to a point 9 on a perpendicular line drawn through the shoulder point 4, a scale S is provided on the section $A'$, laid off from the center line $h$ as a zero line, and graduated in terms of the breast measure, as are also the scales D, M, N, and L, as well as two other scales Y and W. Each of said scales is provided with a series of differently spaced divisions of such distance apart and so numbered that if measurement be made from the zero line or other line of reference with regard to which they are definitely placed, to that one of said divisions corresponding to the breast measure, the distance from said point of reference to said division will be the correct measurement for the particular dimension which said scale is designed to give; it being noted that the divisions of any one scale are not necessarily of uniform size since in many instances they may vary in accordance with definite rules with which I have become acquainted through long experience in the art.

On the section $A'$ of the rule there are, in addition to the scales noted, other scales W and Y extending substantially parallel to each other and numbered from 24 to 52 in terms of breast measurements. These scales are laid off with reference to the outer edge of the section A as a zero line and they are respectively employed to determine the width of the shoulder or the distance from the point 14 to the line 1—2 and the width of the scye, which is the distance from the point 15 to the point 16, corresponding to any given breast measure, while a third scale G is divided into 24ths of an inch for such use as may be desired.

In drafting a pattern such as that indicated by the heavy lines in Fig. 2, it will be understood that the starting point is the breast measure, which, with the waist measure, is actually taken on the person for whom the garment is to be made. In drafting this pattern, two lines 1—3, and 1—4 are drawn at right angles to each other and the various points between which the heavy lines indicating the pattern are drawn, are found by the use of my improved rule, as for example, in order to locate the distance of the line 5—6, giving the depth of the arm scye, from the line 1—4 corresponding to the top of the back, I place the division of the scale D which corresponds to the measured breast dimension, on said line 1—4 and draw the line 5—6 parallel to said first line through a point opposite that division of the scale L corresponding to the breast measure. Similarly, the various other lines and points of the pattern or material to be cut as required in this particular art, are found by the use of the appropriate scales on the rule; it being noted that the two scales B and R are definitely placed relatively to the two lines $b$ and $h$ respectively, and are graduated to indicate the proper waist suppression and the front balance respectively for the different measurements of the breast and waist.

I claim:—

1. A rule provided with a line of reference and having a zero line placed at a distance from said reference line equal to the standard measurement of waist front balance, and two series of arbitrary graduations laid off in opposite directions from the zero line.

2. A rule provided with a line of reference and having a zero line placed at a distance from said reference line equal to the standard measurement of waist suppression, and two series of arbitrary graduations laid off in opposite directions from the zero line.

In testimony whereof, I have signed my name to this specification in the presence of two subscribing witnesses.

GIUSEPPE A. MONGELLI.

Witnesses:
. WALTER CHISM,
Jos. H. KLEIN.